US008477481B2

(12) United States Patent
Zhang et al.

(10) Patent No.: US 8,477,481 B2
(45) Date of Patent: Jul. 2, 2013

(54) ADJUSTABLE BALLAST PLATE

(76) Inventors: Kanghong Zhang, Torrance, CA (US); Brandon Yuan, Culver City, CA (US)

( * ) Notice: Subject to any disclaimer, the term of this patent is extended or adjusted under 35 U.S.C. 154(b) by 209 days.

(21) Appl. No.: 13/215,509

(22) Filed: Aug. 23, 2011

(65) Prior Publication Data

US 2013/0050908 A1 Feb. 28, 2013

(51) Int. Cl.
*H02B 1/30* (2006.01)
*H02B 1/18* (2006.01)

(52) U.S. Cl.
USPC ...... 361/674; 361/679.01; 361/601; 361/752; 361/825; 361/826; 362/148; 362/219; 362/221; 362/222; 362/260; 174/50; 174/57; 174/58; 174/520

(58) Field of Classification Search
USPC ................. 361/601, 674, 752, 755–758, 825, 361/826; 362/147, 148, 219–225, 260, 265, 362/432, 647; 174/50, 57–64, 520, 650, 659, 174/135, 151, 655; 315/276, 291, 307
See application file for complete search history.

(56) References Cited

U.S. PATENT DOCUMENTS

| | | | | |
|---|---|---|---|---|
| 5,662,234 | A * | 9/1997 | Slaby | 220/4.21 |
| 5,942,727 | A * | 8/1999 | Strange | 174/58 |
| 6,368,149 | B1 * | 4/2002 | Schmidt et al. | 439/519 |
| 7,037,139 | B1 * | 5/2006 | Stefaniu et al. | 439/660 |
| 7,461,964 | B1 * | 12/2008 | Aubrey | 362/647 |
| 7,786,391 | B1 * | 8/2010 | Van Pelt et al. | 174/659 |
| 7,830,649 | B2 * | 11/2010 | Yang | 361/674 |
| 8,414,144 | B2 * | 4/2013 | Yochum et al. | 362/221 |
| 2011/0155455 | A1 * | 6/2011 | Chou et al. | 174/560 |

* cited by examiner

*Primary Examiner* — Michail V Datskovskiy
(74) *Attorney, Agent, or Firm* — Clement Cheng

(57) ABSTRACT

A ballast for a florescent or HID lamp includes a housing enclosing florescent or HID lamp ballast electronic components; a plurality of lead wire extending from a side of the housing; and a ballast plate mounted to a housing lower side. The ballast plate is shaped as a planar member having ballast plate sidewalls and includes an adapter plate bottom opening disposed on the ballast plate; and a retainer retaining the ballast plate to the housing. The retainer is secured to the ballast plate, and the ballast plate directs the wire from the side of the housing through the adapter plate bottom opening. An adapter plate front opening is formed on the ballast plate and receives the plurality of lead wire extending from the side of the housing.

16 Claims, 5 Drawing Sheets

ADJUSTABLE BALLAST PLATE

BACKGROUND OF THE INVENTION

A. Field of the Invention

The present invention relates to an electronic ballast for fluorescent or HID lamps.

B. Discussion of Related Art

Fluorescent or HID lighting is widely used in office buildings, shopping centers, warehouses, libraries and school classrooms. Fluorescent or HID lamps require a ballast to work properly. In the US lighting industry, the National Electrical Code requires that all ballast lead wires are to be attached to each individual ballast, either for electronic ballast or electric-magnetic ballast and at least #18 gauge (about 0.92 mm) or thicker solid insulated wire.

Ballasts are typically made with a metal box enclosing a number of different electronic components within the metal box housing. Ballasts are traditionally surface mount with wires extending from the bottom of the box housing or from the side of the box housing. This requires that lighting components be stocked with ballasts having wires coming out of the side and also with ballasts having wires coming out of the bottom with studs.

Electronic ballast can be secured to a junction box by a wide variety of means, such as by nuts and bolts or other connectors. For example, U.S. Pat. No. 5,942,727 issued to inventor Strange on Aug. 24, 1999, the disclosure of which is incorporated herein by reference shows a universal mounting plate for lamp ballasts.

SUMMARY OF THE INVENTION

A ballast for a florescent lamp or high-intensity discharge HID lamp includes a housing enclosing florescent lamp or high-intensity discharge HID ballast electronic components. A plurality of lead wire extends from a side of the housing, and the plurality of lead wire includes a first lead wire, a second lead wire, a third lead wire, and a fourth lead wire.

A ballast plate is mounted to a housing lower side, and the ballast plate is shaped as a planar member having ballast plate sidewalls. The ballast plate has an adapter plate bottom opening disposed on the ballast plate; and a retainer retaining the ballast plate to the housing. When the retainer is secured to the ballast plate, the adapter plate directs the wire from the side of the housing through the adapter plate bottom opening.

An adapter plate front opening is formed on the ballast plate and receiving the plurality of lead wire extending from the side of the housing.

A mounting tab is formed on the housing and extending from the housing, and the adapter plate includes a tab retainer retaining the mounting tab.

A rear tab is formed on a rear portion of the housing, and the housing has a rear tab retainer with a rear tab retainer opening engaging with the ballast plate. An adapter plate front opening is formed on the adapter plate and receives the plurality of lead wire extending from the side of the housing to direct the plurality of lead wire through the adapter plate bottom opening. An adapter plate front opening formed on the ballast plate and receiving the plurality of lead wire extending from the side of the housing. A mounting tab is formed on the housing and extending from the housing. The adapter plate further includes a tab retainer retaining the mounting tab.

A rear tab is formed on a rear portion of the housing, and the housing further includes a rear tab retainer with a rear tab retainer opening engaging with the ballast plate. A front opening top plate is formed from the ballast plate, and the front opening top plate covers a portion of the adapter plate front opening. They front opening top plate is substantially parallel to the ballast plate. The front opening side plate formed from the ballast plate, and the front opening side plate covers a side portion of the adapter plate front opening. The front opening side plate is substantially parallel a side of the housing.

Embodiments of the invention will now be described by way of example with reference to the accompanying drawings.

BRIEF DESCRIPTION OF THE DRAWINGS

Similar reference numbers denote corresponding features throughout the attached drawings.

Figure 1:
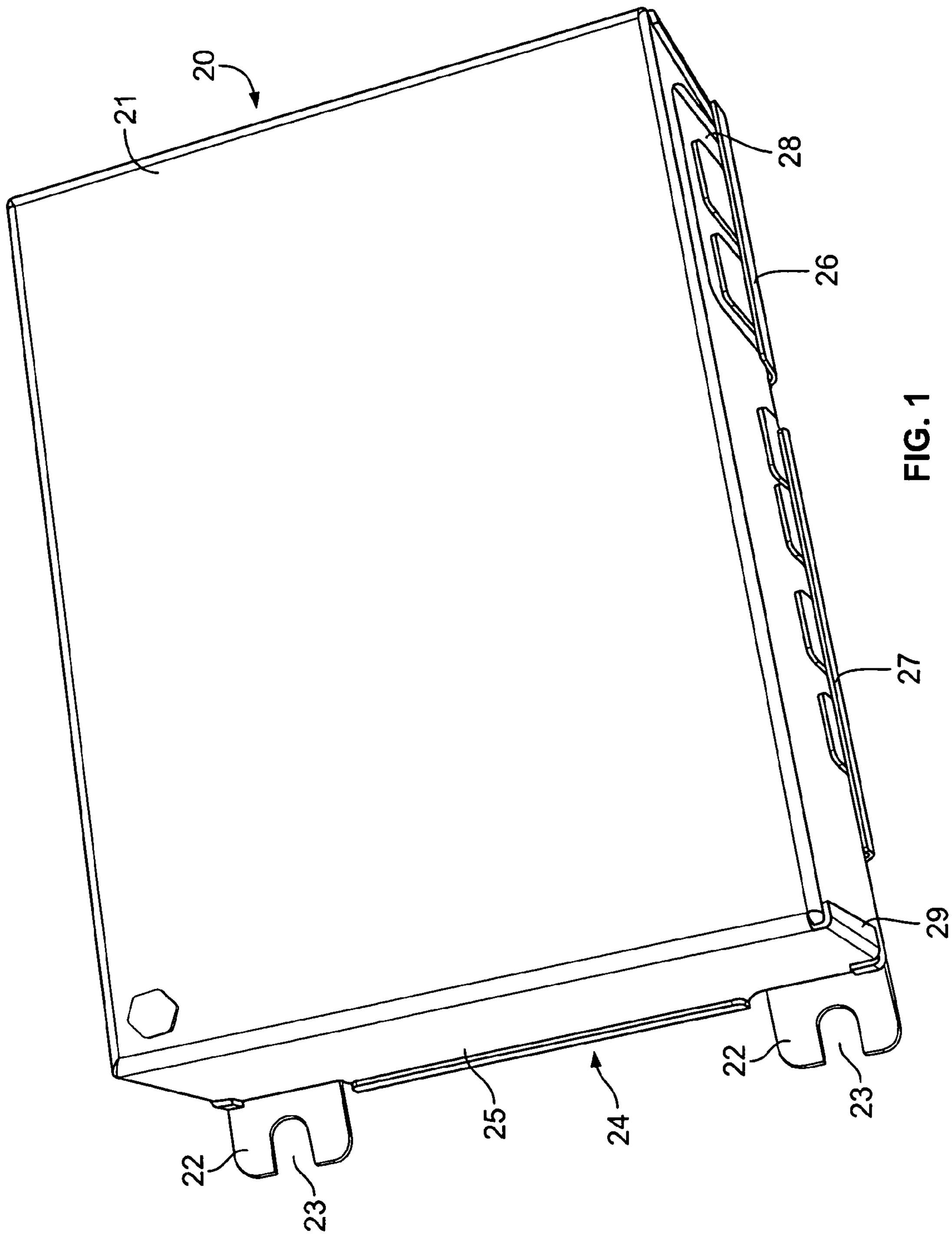
FIG. 1 is a perspective view of the top of a housing.
Figure 2:
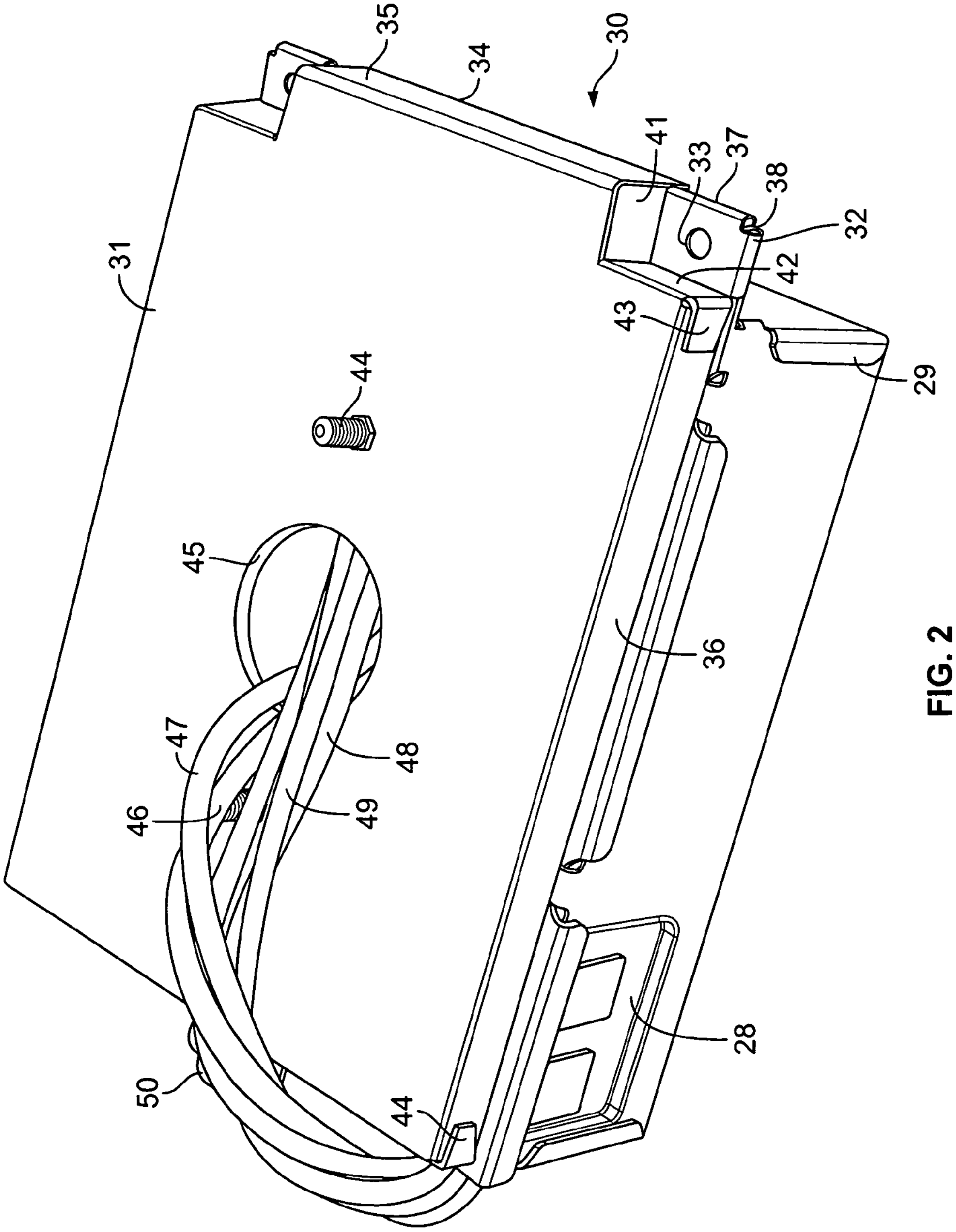
FIG. 2 is a bottom perspective view of the housing.
Figure 3:
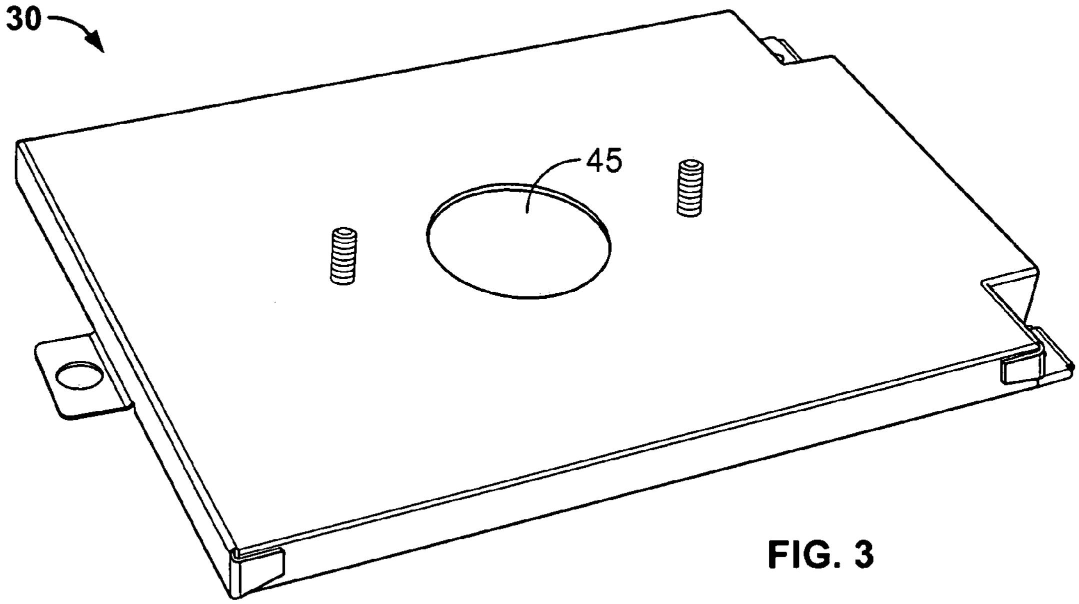
FIG. 3 is a bottom perspective view of the adapter plate.
Figure 4:
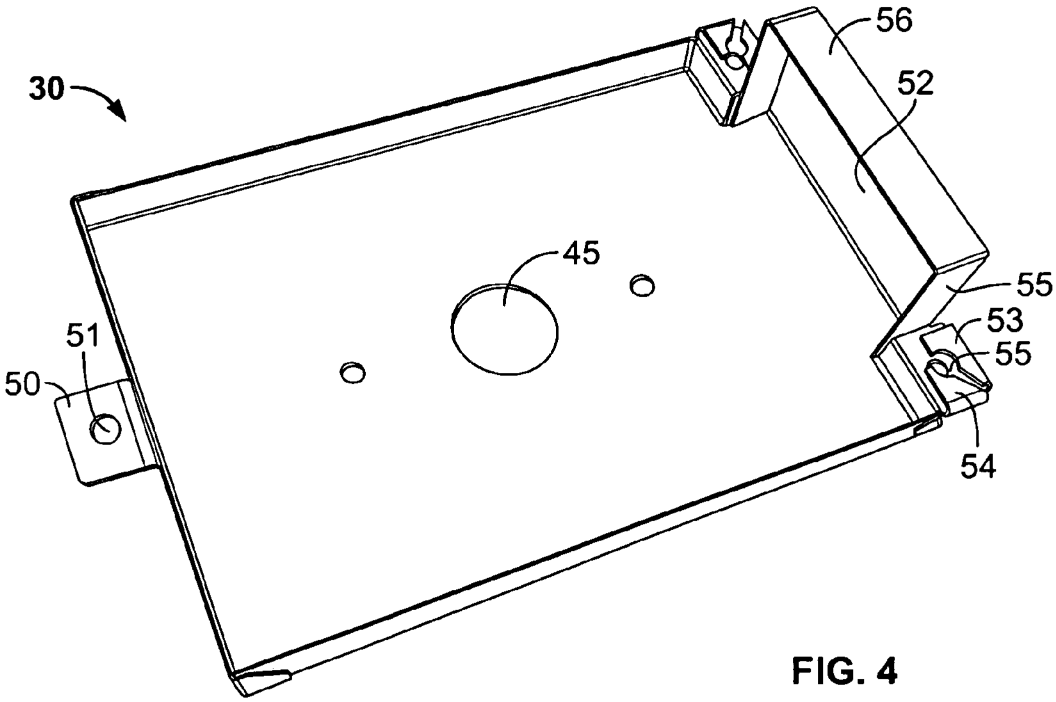
FIG. 4 is a top perspective view of the adapter plate.

20 Housing
21 Housing Top
22 Mounting Tab
23 Mounting Notch
24 Housing Bottom Edge
25 Housing Wire Outlet Side
26 Housing Rear Side Retainer
27 Housing Front Side Retainer
28 Housing Aperture
29 Connection Finger
30 Adapter Plate
31 Adapter Plate Bottom Side
32 Side Tab Retainer
33 Tab Retainer Opening
34 Adapter Plate Opening Edge
35 Adapter Plate Front Side
36 Adapter Plate Side Face
37 Front Tab Retainer
38 Tab Retainer Corner Notch
41 Adapter Plate Front Side First Bevel
42 Adapter Plate Front Side Second Bevel
43 Side Retainer
44 Mounting Bolt
45 Adapter Plate Bottom Opening
46 First Wire Lead
47 Second Wire Lead
48 Third Wire Lead
49 Fourth Wire Lead
50 Rear Tab Retainer
51 Rear Tab Retainer Opening
52 Adapter Plate Front Opening
53 Front Tab Retainer Prong
54 Side Tab Retainer Prong
55 Pronged Opening
56 Front Opening Top Plate
58 Front Opening Side Plate

DETAILED DESCRIPTION OF THE PREFERRED EMBODIMENT

The adjustable ballast plate can be formed as an adapter plate 30. The adapter plate 30 is secured to the housing 20. The adapter plate can reroute the wires to a downward position from a side position. The adapter plate connects with the housing 20 at mounting tabs 22. Each of the mounting tabs 22 have a mounting notch 23. The housing 20 also has a housing top 21. The housing wire outlet side 25 is the front side where the wires come out. The mounting notch 23 can receive screws or bolts for securing the housing to the adapter plate 30. The housing top 21 is preferably made of a folded metal sheet so that sides of the housing connect together, such as connection finger 29. The housing may also have a housing aperture 28 to allow ventilation. The housing 20 may include a housing rear side retainer 26 and a housing front side retainer 27 form as flaps of metal securing the folded metal sheet structure together. Wires that protrude from the housing bottom edge 24 can be rerouted from a frontal orientation to a downward orientation.

The adapter plate 30 has a side tab retainer 32 and a tab retainer opening 33. The adapter plate has an opening edge 34 where the wires extending from the housing are bent back along the adapter plate front side 35 and then under the adapter plate bottom side 31. The wires are retained within the generally rectangular space formed between the adapter plate bottom side 31, and the adapter plate front side 35 which has an adapter plate opening edge 34. The tab retainer corner notch 38 is formed between the tab retainer 32 and the front tab retainer 37. The side tab retainer 32 and the front tab retainer 37 fold over the mounting tab 22 so that the mounting notch 23 winds up with the tab retainer opening 33. The mounting 22 is therefore engaged with the side tab retainer 32 and the front tab retainer 37.

The mounting bolt 44 extends from the adapter plate bottom side 31 of the adapter plate 30. A pair of mounting bolts 44 can be disposed on the adapter plate 30. The mounting bolts 44 may receive nuts for securing the ballast to a light fixture. The adapter plate bottom opening 45 allows the wires to extend from the ballast. The adapter plate bottom opening 45 is preferably circular. The wires, such as the first wire lead 46, the second wire lead 27, the third wire lead 48, and the fourth wire lead 49 can be used for input power and output power as well as neutral and ground wires. The adapter plate front side may have bevels such as an adapter plate front side first bevel 41 and an adapter plate front side second bevel 42. The adapter plate front side second bevel 42 can extend to a side retainer 43 forming a folded section of the adapter plate front side second bevel 43.

Figure 5:
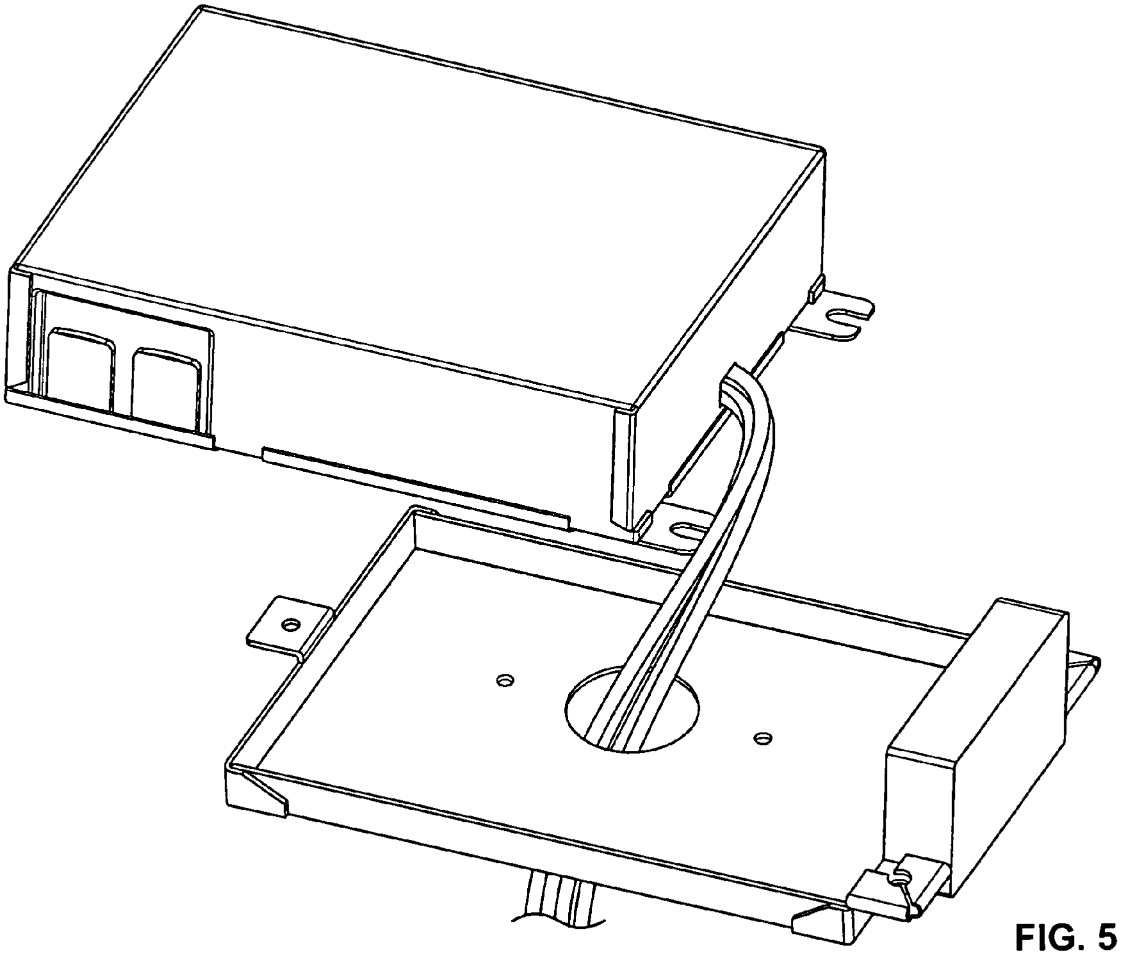
FIG. 5 is an exploded view diagram showing assembly of the housing to the adapter plate.
Figure 6:
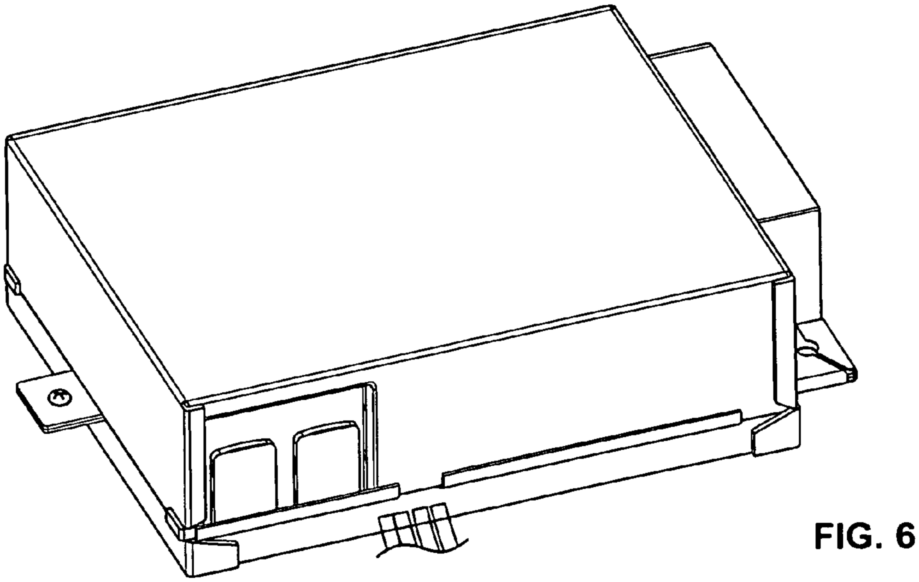
FIG. 6 is the assembled version of the exploded view diagram.
Figure 7:
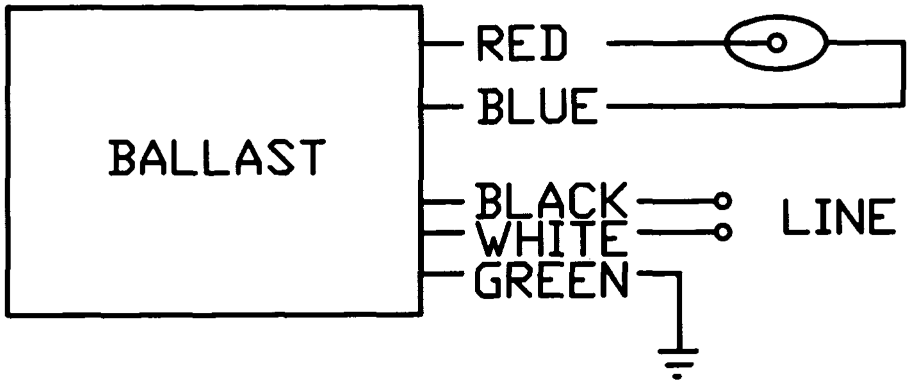
FIG. 7 is a circuit diagram of the present invention.

Opposite the front tab retainer 37 is a rear tab retainer 50. The rear tab retainer 50 has a rear tab retainer opening 51 that receives a bolt which connects the adapter plate 30 to the housing 20. The rear tab retainer 50 is on the rear of the device and the front tabs are on the front of the device. The adapter plate rear tab retainer formed on the adapter plate connects with the rear tab retainer 50 formed on the housing, as seen in FIGS. 5, 6. The rear tab retainer 50 can also be called the housing rear tab retainer because it extends from a rear portion of the housing.

The side tab retainer 32 extends over the mounting tab 22 to form a side tab retainer prong 54. The front tab retainer prong 53 is an extension of the front tab retainer 37. The pronged opening 55 is disposed between the front tab retainer prong 53 and the side tab retainer prong 54. The pronged opening 55 is preferably concentric with the tab retainer opening 33.

Once installed to the ballast, the adapter plate has an adapter plate front opening 52 that routes wires extending from the front of the ballast downward to the adapter plate bottom opening 45. The adapter plate front opening 52 is covered on a top side by the front opening top plate 56 and is covered on a side by the front opening side plate 58. The adapter plate front opening 52 is defined between the adapter plate front side 35 and the ballast housing.

It is to be understood that the present invention is not limited to the sole embodiment described above, but encompasses any and all embodiments within the scope of the following claims.

The invention claimed is:

1. A ballast for a florescent or HID lamp comprising:

a. a housing enclosing florescent or HID lamp ballast electronic components;

b. a plurality of lead wire extending from a side of the housing, wherein the plurality of lead wire comprises a first lead wire, a second lead wire, a third lead wire, and a fourth lead wire;

c. a ballast plate mounted to a housing lower side, wherein the ballast plate is shaped as a planar member having ballast plate sidewalls and further includes:

i. an adapter plate bottom opening disposed on the ballast plate; and ii. a retainer retaining the ballast plate to the housing, wherein when the retainer is secured to the ballast plate, the adapter plate directs the wire from the side of the housing through the adapter plate bottom opening.

2. The ballast for a florescent or HID lamp of claim 1, further comprising: an adapter plate front opening formed on the ballast plate and receiving the plurality of lead wire extending from the side of the housing.

3. The ballast for a florescent or HID lamp of claim 1, further comprising: a mounting tab formed on the housing and extending from the housing, wherein the adapter plate further includes a tab retainer retaining the mounting tab.

4. The ballast for a florescent or HID lamp of claim 1, further including a rear tab formed on a rear portion of the housing, wherein the housing further includes a rear tab retainer with a rear tab retainer opening engaging with the ballast plate.

5. The ballast for a florescent or HID lamp of claim 1, further comprising: an adapter plate front opening formed on the adapter plate and receiving the plurality of lead wire extending from the side of the housing to direct the plurality of lead wire through the adapter plate bottom opening.

6. The ballast for a florescent or HID lamp of claim 5, further comprising: an adapter plate front opening formed on the ballast plate and receiving the plurality of lead wire extending from the side of the housing.

7. The ballast for a florescent or HID lamp of claim 5, further comprising: a mounting tab formed on the housing and extending from the housing, wherein the adapter plate further includes a tab retainer retaining the mounting tab.

8. The ballast for a florescent or HID lamp of claim 5, further including a rear tab formed on a rear portion of the housing, wherein the housing further includes a rear tab retainer with a rear tab retainer opening engaging with the ballast plate.

9. The ballast for a florescent or HID lamp of claim 5, further comprising: a front opening top plate formed from the ballast plate, wherein the front opening top plate covers a portion of the adapter plate front opening, wherein the front opening top plate is substantially parallel to the ballast plate.

10. The ballast for a florescent or HID lamp of claim 9, further comprising: an adapter plate front opening formed on the ballast plate and receiving the plurality of lead wire extending from the side of the housing.

11. The ballast for a florescent or HID lamp of claim 9, further comprising: a mounting tab formed on the housing and extending from the housing, wherein the adapter plate further includes a tab retainer retaining the mounting tab.

12. The ballast for a florescent or HID lamp of claim 9, further including a rear tab formed on a rear portion of the housing, wherein the housing further includes a rear tab retainer with a rear tab retainer opening engaging with the ballast plate.

13. The ballast for a florescent or HID lamp of claim 5, further comprising: a front opening side plate formed from the ballast plate, wherein the front opening side plate covers a side portion of the adapter plate front opening, wherein the front opening side plate is substantially parallel a side of the housing.

14. The ballast for a florescent or HID lamp of claim 13, further comprising: an adapter plate front opening formed on the ballast plate and receiving the plurality of lead wire extending from the side of the housing.

15. The ballast for a florescent or HID lamp of claim 13, further comprising: a mounting tab formed on the housing and extending from the housing, wherein the adapter plate further includes a tab retainer retaining the mounting tab.

16. The ballast for a florescent or HID lamp of claim 13, further including a rear tab formed on a rear portion of the housing, wherein the housing further includes a rear tab retainer with a rear tab retainer opening engaging with the ballast plate.

* * * * *